(12) United States Patent
Dhindhsa et al.

(10) Patent No.: US 11,823,481 B2
(45) Date of Patent: Nov. 21, 2023

(54) ADAPTIVE ACTIVATION OF FINGERPRINT SENSOR AREAS

(71) Applicant: QUALCOMM Incorporated, San Diego, CA (US)

(72) Inventors: Kritpal Singh Dhindhsa, Hyderabad (IN); Rakesh Pallerla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/646,355

(22) Filed: Dec. 29, 2021

(65) Prior Publication Data
US 2023/0206679 A1    Jun. 29, 2023

(51) Int. Cl.
*G06V 40/13* (2022.01)
*G06F 3/04886* (2022.01)

(52) U.S. Cl.
CPC .......... *G06V 40/13* (2022.01); *G06F 3/04886* (2013.01)

(58) Field of Classification Search
CPC .......... G06V 40/12–1329; G06F 3/048–04897
See application file for complete search history.

(56) References Cited

U.S. PATENT DOCUMENTS

| | | | | |
|---|---|---|---|---|
| 8,413,067 B2* | 4/2013 | Cohen | G06F 3/04886 | 715/764 |
| 8,504,934 B1* | 8/2013 | Yu | G06F 3/04886 | 345/173 |
| 8,719,719 B2* | 5/2014 | Cohen | G06F 3/0484 | 715/764 |
| 10,365,819 B2* | 7/2019 | Migos | G06F 3/04886 | |
| 10,620,701 B2* | 4/2020 | Siripurapu | G06F 3/011 | |
| 10,732,833 B2* | 8/2020 | Choi | G06F 3/04886 | |
| 10,747,368 B2* | 8/2020 | Zhang | G06F 3/0481 | |
| 10,885,304 B2* | 1/2021 | Huang | G06V 40/1306 | |
| 10,948,992 B1* | 3/2021 | Bai | G06F 3/014 | |
| 11,048,909 B2* | 6/2021 | Lin | G06V 40/13 | |
| 11,500,453 B2* | 11/2022 | Ohashi | G06F 3/011 | |
| 11,507,444 B1* | 11/2022 | Hamlin | G06F 11/3006 | |
| 2006/0197750 A1* | 9/2006 | Kerr | G06F 1/1647 | 345/173 |
| 2012/0324381 A1* | 12/2012 | Cohen | G06F 3/04886 | 715/765 |

(Continued)

FOREIGN PATENT DOCUMENTS

EP    3358455 A1    8/2018

OTHER PUBLICATIONS

International Search Report and Written Opinion—PCT/US2022/079251—ISA/EPO—dated Mar. 7, 2023.

*Primary Examiner* — Patrick F Marinelli
(74) *Attorney, Agent, or Firm* — QUALCOMM Incorporated

(57) ABSTRACT

In some implementations a method may involve presenting a graphical user interface in a first configuration on a display of an apparatus. The first configuration may correspond with a first display area. The method may involve enabling operation of a fingerprint sensor system in a first fingerprint sensor area corresponding with at least a portion of the first display area. The method may involve presenting the graphical user interface in a second configuration on the display and enabling fingerprint sensor system operation only in a second fingerprint sensor area corresponding with the second configuration.

12 Claims, 11 Drawing Sheets

(56) References Cited

U.S. PATENT DOCUMENTS

| | | | |
|---|---|---|---|
| 2012/0324384 A1* | 12/2012 | Cohen | G06F 9/451 |
| | | | 715/765 |
| 2015/0133084 A1* | 5/2015 | Baek | G06V 40/50 |
| | | | 455/411 |
| 2017/0235365 A1* | 8/2017 | Siripurapu | G06F 3/015 |
| | | | 345/173 |
| 2018/0157893 A1* | 6/2018 | Lee | G06F 21/32 |
| 2018/0183915 A1* | 6/2018 | Zhao | H04M 1/72412 |
| 2018/0188950 A1* | 7/2018 | Choi | G06F 3/04886 |
| 2019/0130087 A1 | 5/2019 | Mori et al. | |
| 2019/0179485 A1* | 6/2019 | Zhang | G06F 3/0488 |
| 2019/0294296 A1* | 9/2019 | Zhang | G06F 3/0481 |
| 2020/0082143 A1* | 3/2020 | Yang | G06F 3/041 |
| 2020/0097700 A1* | 3/2020 | Lin | G06V 40/1306 |
| 2020/0125144 A1* | 4/2020 | Chung | G06F 1/1652 |
| 2020/0167451 A1* | 5/2020 | Zhang | G06F 21/32 |
| 2020/0210677 A1* | 7/2020 | Huang | G06V 10/147 |
| 2020/0265203 A1* | 8/2020 | Tuneld | G06F 3/04146 |
| 2022/0036035 A1* | 2/2022 | Wu | G06F 3/0488 |
| 2022/0244846 A1* | 8/2022 | Zhao | G06F 3/04886 |
| 2022/0291831 A1* | 9/2022 | Yang | G06F 3/04883 |

\* cited by examiner

ADAPTIVE ACTIVATION OF FINGERPRINT SENSOR AREAS

TECHNICAL FIELD

This disclosure relates generally to sensor devices and related methods, including but not limited to fingerprint sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a display system including at least a first display, a fingerprint sensor system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the display system to present a graphical user interface in a first configuration on the first display, the first configuration corresponding with a first display area of the first display. The control system may be configured to enable operation of the fingerprint sensor system in a first fingerprint sensor area corresponding with at least a portion of the first display area. The control system may be configured to control the display system to present the graphical user interface in a second configuration on the first display. The control system may be configured to enable fingerprint sensor system operation only in a second fingerprint sensor area corresponding with the second configuration.

According to some implementations, the second fingerprint sensor area may correspond with only a portion of the first fingerprint sensor area. In some examples, the second configuration may correspond with a second display area of the first display. In some such examples, the second display area may correspond with only a portion of the first display area. In some examples, the second configuration may correspond with a single-handed operational mode.

In some implementations, the apparatus may include a user interface system. In some such implementations, the control system may be further configured to receive, via the user interface system, an indication to enable the single-handed operational mode prior to presenting the graphical user interface in the second configuration.

In some examples, the control system may be further configured to obtain fingerprint sensor data from the fingerprint sensor system in the second fingerprint sensor area and to perform an authentication process based, at least in part, on the fingerprint sensor data. In some such examples, the authentication process may correspond to a payment application area of the graphical user interface in the second configuration. The payment application area may correspond with at least a portion of the second fingerprint sensor area.

According to some examples, the second configuration may correspond with a split-screen configuration. In some such examples, the control system may be further configured to enable fingerprint sensor system operation in a first portion of the split-screen configuration and to disable fingerprint sensor system operation in a second portion of the split-screen configuration.

In some examples, the second configuration may correspond with a pop-up view configuration. In some such examples, the control system may be further configured to enable fingerprint sensor system operation in a first portion of the pop-up view configuration and to disable fingerprint sensor system operation in a second portion of the pop-up view configuration.

Other innovative aspects of the subject matter described in this disclosure may be implemented in a method. In some examples, the method may involve presenting a graphical user interface in a first configuration on a display of an apparatus, the first configuration corresponding with a first display area and enabling operation of a fingerprint sensor system in a first fingerprint sensor area corresponding with at least a portion of the first display area. In some such examples, the method may involve presenting the graphical user interface in a second configuration on the display and enabling fingerprint sensor system operation only in a second fingerprint sensor area corresponding with the second configuration.

According to some implementations, the second fingerprint sensor area may correspond with only a portion of the first fingerprint sensor area. In some examples, the second configuration may correspond with a second display area of the first display. In some such examples, the second display area may correspond with only a portion of the first display area.

In some examples, the second configuration may correspond with a single-handed operational mode. In some such examples, the method may involve receiving an indication that the single-handed operational mode has been enabled prior to presenting the graphical user interface in the second configuration.

According to some examples, the second fingerprint sensor area may correspond with some or all of the second display area. In some such examples, the method may involve obtaining fingerprint sensor data from the fingerprint sensor system in the second fingerprint sensor area and performing an authentication process based, at least in part, on the fingerprint sensor data. In some such examples, the authentication process may correspond to a payment application area of the graphical user interface in the second configuration. The payment application area may correspond with at least a portion of the second fingerprint sensor area.

In some examples, the first display area may correspond with the entire display area.

According to some examples, the second configuration may correspond with a split-screen configuration. In some such examples, fingerprint sensor system operation may be enabled in a first portion of the split-screen configuration and disabled in a second portion of the split-screen configuration.

In some examples, the second configuration may correspond with a pop-up view configuration. In some such examples, fingerprint sensor system operation may be enabled in a first portion of the pop-up view configuration and disabled in at least a second portion of the pop-up view configuration.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve presenting a graphical user interface in a first configuration on a display of an apparatus, the first configuration corresponding with a first display area and enabling operation of a fingerprint sensor system in a first fingerprint sensor area corresponding with at least a portion of the first display area. In some such examples, the method may involve presenting the graphical user interface in a second configuration on the display and enabling fingerprint sensor system operation only in a second fingerprint sensor area corresponding with the second configuration.

According to some implementations, the second fingerprint sensor area may correspond with only a portion of the first fingerprint sensor area. In some examples, the second configuration may correspond with a second display area of the first display. In some such examples, the second display area may correspond with only a portion of the first display area.

In some examples, the second configuration may correspond with a single-handed operational mode. In some such examples, the method may involve receiving an indication that the single-handed operational mode has been enabled prior to presenting the graphical user interface in the second configuration.

According to some examples, the second fingerprint sensor area may correspond with some or all of the second display area. In some such examples, the method may involve obtaining fingerprint sensor data from the fingerprint sensor system in the second fingerprint sensor area and performing an authentication process based, at least in part, on the fingerprint sensor data. In some such examples, the authentication process may correspond to a payment application area of the graphical user interface in the second configuration. The payment application area may correspond with at least a portion of the second fingerprint sensor area.

In some examples, the first display area may correspond with the entire display area.

According to some examples, the second configuration may correspond with a split-screen configuration. In some such examples, fingerprint sensor system operation may be enabled in a first portion of the split-screen configuration and disabled in a second portion of the split-screen configuration.

In some examples, the second configuration may correspond with a pop-up view configuration. In some such examples, fingerprint sensor system operation may be enabled in a first portion of the pop-up view configuration and disabled in at least a second portion of the pop-up view configuration.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
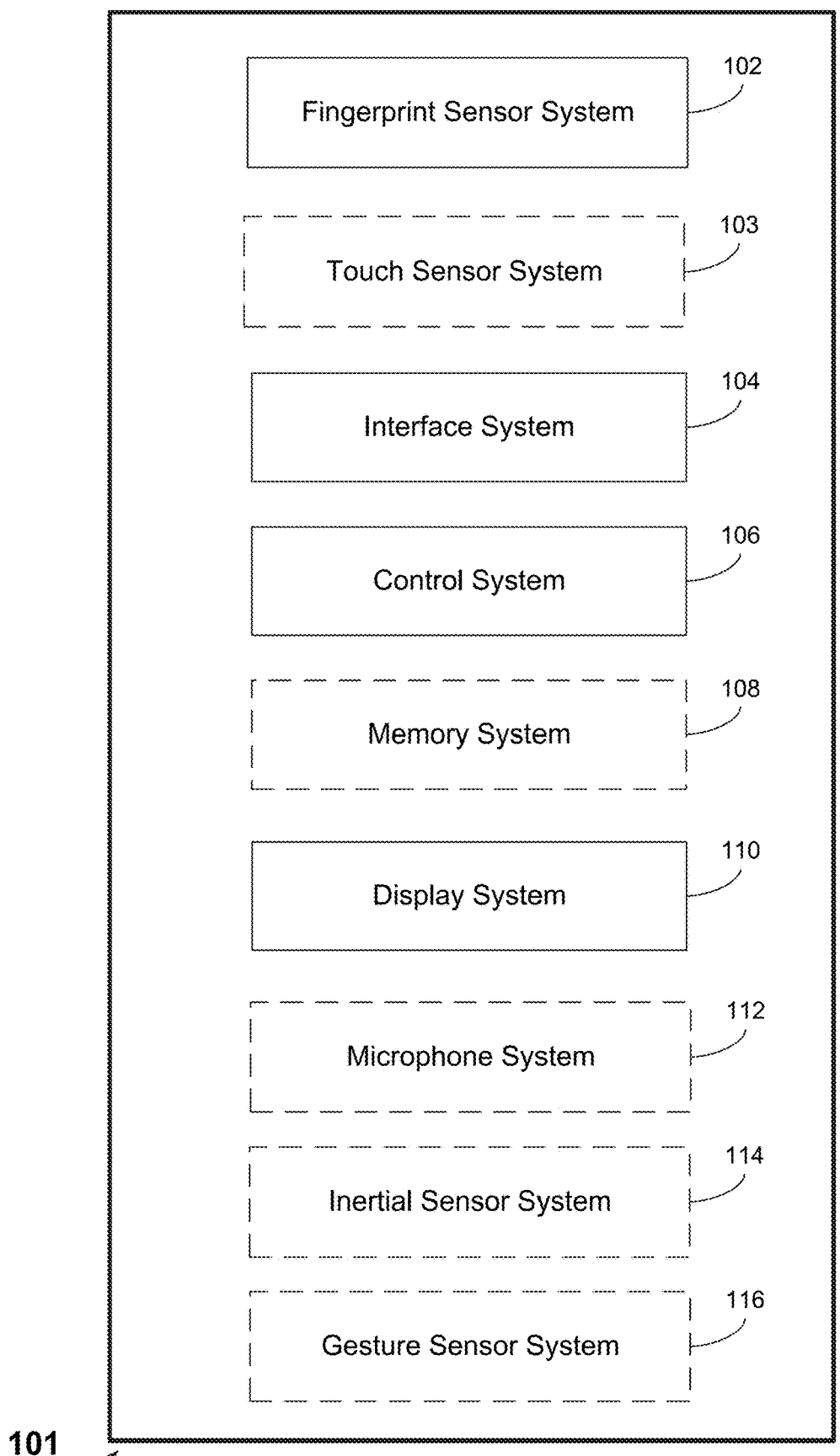
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The screen sizes of mobile devices, such as cellular telephones, have been increasing in recent years. It is common for a graphical user interface (GUI) to occupy most of the active display area of a mobile device. If a mobile device is being held in a user's hand, it can be very difficult to interact with the entire GUI (for example, to reach all icons displayed in a GUI) with the same hand. For example, if a user is holding the lower half of a cellular telephone with one hand, it may be difficult or impossible for the user to reach icons displayed in the upper half of the device's display screen with the same hand. Therefore, increasing numbers of mobile devices are capable of implementing some type of single-handed operational mode or "one-handed mode" that allows a user to reach an entire GUI with a single hand, typically by presenting the entire GUI in a smaller portion of the display.

If a mobile device is operating in a one-handed mode, a split-screen mode or a pop-up mode, in some instances only a portion of a fingerprint sensor area corresponds with the displayed GUI (or corresponds with a portion of the displayed GUI that may require fingerprint authentication). Operating the remaining portion(s) of the fingerprint sensor system wastes power. Increasingly larger fingerprint sensor areas are being contemplated for mobile devices. The larger the fingerprint sensor area, the more power may potentially be wasted.

Some disclosed methods involve adaptive activation of fingerprint sensor areas. Some such methods involve dynamically changing the active fingerprint sensor area based on one or more displayed GUIs. Some such methods involve enabling fingerprint sensor system operation only in a fingerprint sensor area that corresponds with a "one-handed mode" configuration of a GUI. Some methods involve enabling fingerprint sensor system operation only in one or more fingerprint sensor areas that correspond with a portion of a split-screen mode or a pop-up mode configuration.

Particular implementations of the subject matter described in this disclosure may be implemented to realize one or more of the following potential advantages. Some disclosed methods can reduce the power consumption of a fingerprint sensor system. Less power is wasted by enabling fingerprint sensor system operation only in one or more fingerprint sensor areas that correspond with one or more GUI portions that may potentially involve use of fingerprint authentication functionality. The power savings may include power saved by reducing the usage of a fingerprint sensor transmitter, as well as power saved by reducing the corresponding amount of fingerprint image processing.

FIG. 1 is a block diagram that shows example components of an apparatus according to some disclosed implementations. In this example, the apparatus 101 includes a fingerprint sensor system 102, an interface system 104, a control system 106 and a display system. Some implementations may include a touch sensor system 103, a memory system 108, a microphone system 112, an inertial sensor system 114 and/or a gesture sensor system 116.

According to some examples, the fingerprint sensor system 102 may be, or may include, an ultrasonic fingerprint sensor. Alternatively, or additionally, in some implementations the fingerprint sensor system 102 may be, or may include, another type of fingerprint sensor, such as an optical fingerprint sensor, a photoacoustic fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the inertial sensor system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the display system 110. In implementations wherein the apparatus includes a fingerprint sensor system 102, the control system 106 is configured for communication with, and for controlling, the fingerprint sensor system 102. In implementations wherein the apparatus includes a touch sensor system 103, the control system 106 is configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a microphone system 112, the control system 106 is configured for communication with, and for controlling, the microphone system 112. In implementations wherein the apparatus includes an inertial sensor system 114, the control system 106 is configured for communication with, and for controlling, the inertial sensor system 114. According to some examples, the control system 106 may include one or more dedicated components that are configured for controlling the fingerprint sensor system 102, the touch sensor system 103, the memory system 108, the display system 110, the microphone system 112 and/or the inertial sensor system 114.

Some examples of the apparatus 101 may include dedicated components that are configured for controlling at least a portion of the fingerprint sensor system 102 (and/or for processing fingerprint image data received from the fingerprint sensor system 102). Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include an inertial sensor system 114. The inertial sensor system 114 may include one or more types of inertial sensors, such as one or more gyroscopes and/or one or more accelerometers. The inertial sensor system 114 may be configured to provide inertial sensor data to the control system 106 indicating the orientation of the apparatus 101, acceleration of the apparatus 101, etc.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
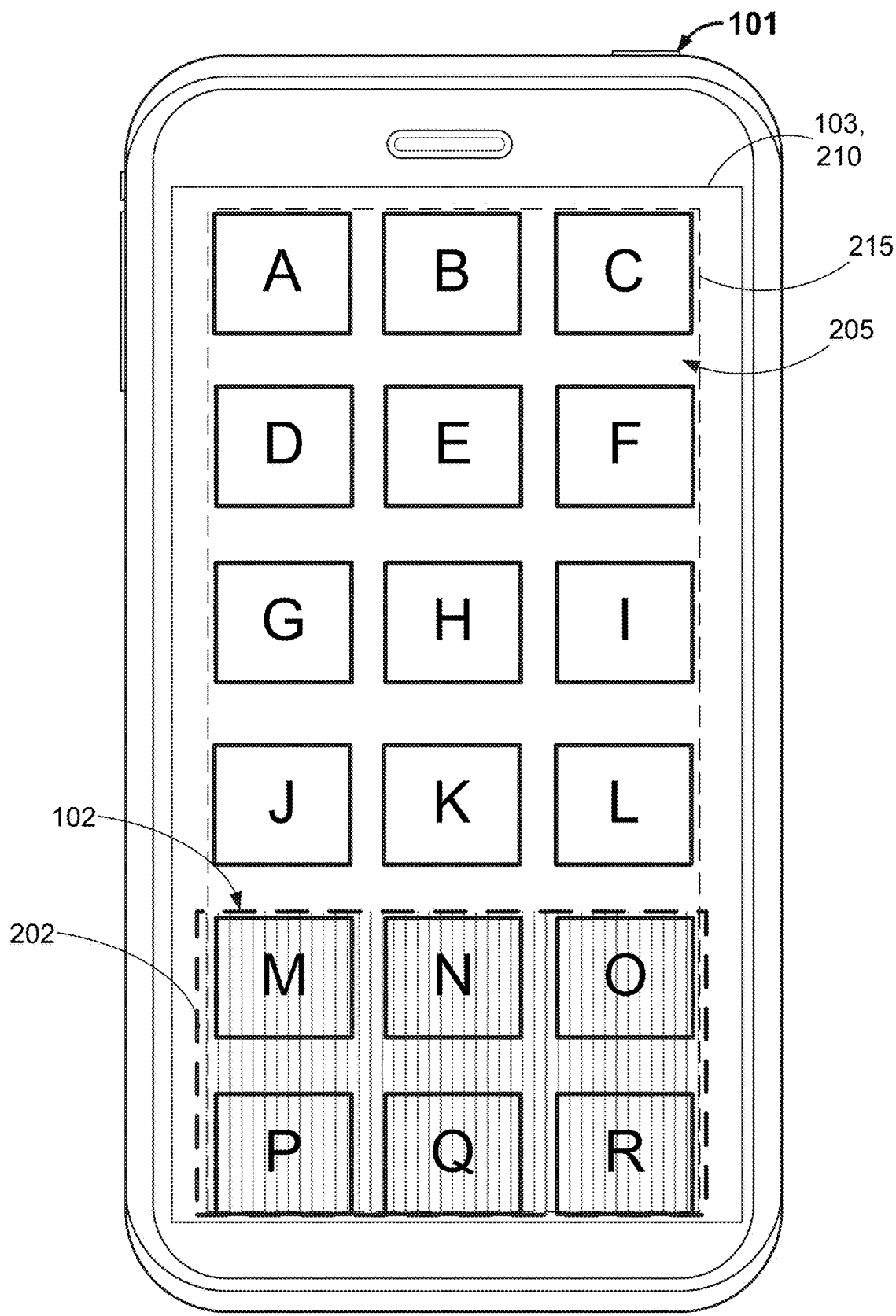
FIG. 2 shows an example of the apparatus of FIG. 1 with a graphical user interface (GUI) in a first configuration.

FIG. 2 shows an example of the apparatus of FIG. 1 with a graphical user interface (GUI) in a first configuration. As with other disclosed implementations, the scale, numbers, arrangements and types of the elements shown in FIG. 2 are merely presented for illustrative purposes. Other implementations of the apparatus 101 may have different numbers, arrangements and/or types of elements.

In this example, the apparatus 101 includes a fingerprint sensor system 102, a touch sensor system 103, a control system 106 (not shown) and a display system 110, which are instances of the fingerprint sensor system 102, touch sensor system 103, control system 106 and display system 110 that are described above with reference to FIG. 1. In some implementations, the fingerprint sensor system 102 may be, or may include, an ultrasonic fingerprint sensor. In other examples, the fingerprint sensor system 102 may be, or may include, another type of fingerprint sensor, such as an optical fingerprint sensor, a photoacoustic fingerprint sensor, etc. In this implementation, the touch sensor system 103 is coextensive with a display 210 of the display system 110.

According to this example, the fingerprint sensor system 102 has an fingerprint sensor area 202, shown with vertical-line fill and outlined by a bold dashed rectangle. The fingerprint sensor area 202 of the fingerprint sensor system 102 is shown in a dashed outline because it resides below the display system 110 in this example. The fingerprint sensor area 202 may, for example, be the area in which an array of fingerprint sensor pixels resides. In other examples, the fingerprint sensor area 202 (and therefore the corresponding fingerprint sensor area) may be larger or smaller than that indicated in FIG. 2, or may be the same size but in a different location.

In this example, a GUI 205 presented on the display 210 includes icons A through R, with which a user may interact via the touch sensor system 103. In this example, the GUI 205 is being presented in a first configuration in the area 215. Because the area 215 occupies most of the display 210, the first configuration of the GUI 205 is one example of what may be referred to herein as a "full-screen mode." According to this example, icons M through R are within the fingerprint sensor area 202 when the GUI 205 is being presented in the first configuration. Therefore, the apparatus 101 is capable of providing fingerprint authentication functionality when a user touches an area corresponding to any of the icons M through R. For example, if the icon P corresponds with a payment software application (app), the apparatus 101 could provide fingerprint authentication functionality for the payment app responsive to, for example, a user touch in the area of the icon P.

Figure 3A:
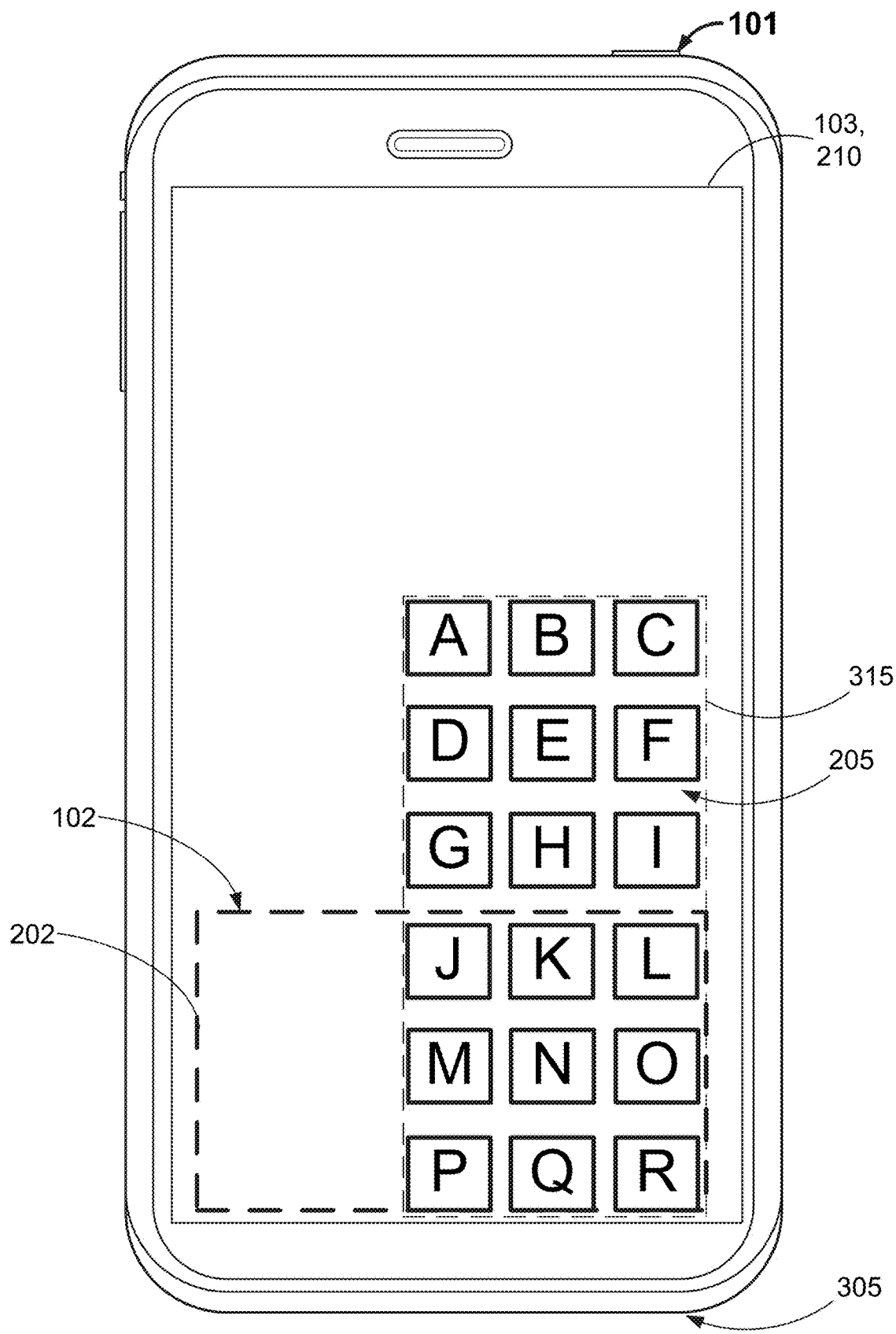
FIG. 3A shows an example of the apparatus of FIG. 2 with a GUI in a second configuration.

FIG. 3A shows an example of the apparatus of FIG. 2 with a GUI in a second configuration. In this example, the GUI 205 includes the same elements as the GUI 205 of FIG. 2. However, the GUI 205 of FIG. 3A is being presented in a second configuration in which the icons A through R are being presented in the area 315, which is smaller than the area 215. Because the area 315 corresponding to the second configuration of the GUI 205 is close to the bottom portion 305 of the apparatus 101, the icons A through R may be reachable by digits of the same hand with which a user is holding the apparatus 101, if the apparatus 101 is being held by the bottom portion 305. Accordingly, the second configuration is one example of what may be referred to herein as a single-handed operational mode, as a "one-handed mode," or the like.

According to this example, icons J through R are within the fingerprint sensor area 202 of the fingerprint sensor system 102 when the GUI 205 is being presented in the second configuration. Therefore, the apparatus 101 is capable of providing fingerprint authentication functionality when a user touches an area corresponding to any of the icons J through R when the GUI 205 is being presented in the second configuration.

However, in this example, when the GUI 205 is being presented in the second configuration a substantial portion of the fingerprint sensor area 202 does not correspond with the area in which any icons of the GUI 205 are being presented. Therefore, the portion of the fingerprint sensor area 202 that is outside of the area 315 may not be used in connection with any icon of the second configuration of the GUI 205. Power that is used for the portion of the fingerprint sensor area 202 that is outside of the area 315 may, in such examples, be wasted.

Figure 3B:
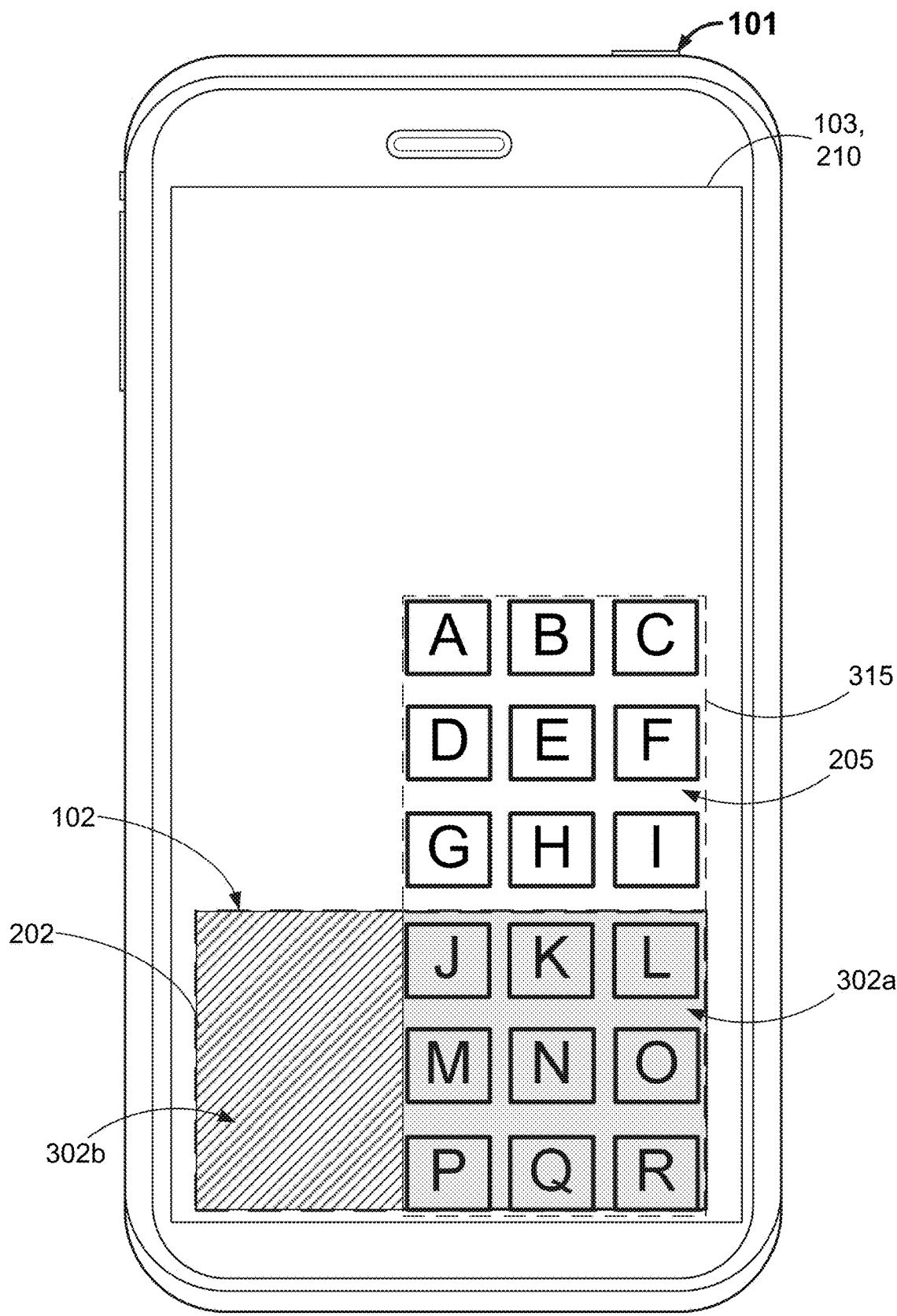
FIG. 3B shows another example of the apparatus of FIG. 2 with the GUI in the second configuration.

FIG. 3B shows another example of the apparatus of FIG. 2 with the GUI in the second configuration. In this example, when the GUI 205 is being presented in the second configuration, the control system is enabling operation of the fingerprint sensor system 102 only in the active fingerprint sensor area 302a, which corresponds with the overlap of the area 315 and the fingerprint sensor area 202. In this example, the control system is not enabling operation of the fingerprint sensor system 102 in the inactive fingerprint sensor area 302b, which is outside the area of the GUI 205 (area 315) when the GUI 205 is being presented in the second configuration.

Accordingly, FIG. 3B shows one example of a method of adaptive activation of a fingerprint sensor area. In some such examples, adaptive activation of a fingerprint sensor area may involve determining an area of overlap (also referred to herein as an overlap area) between a GUI (or a portion of a GUI) and a fingerprint sensor area. Some such examples may involve enabling fingerprint sensor system operation only in the overlap area.

Figure 4:
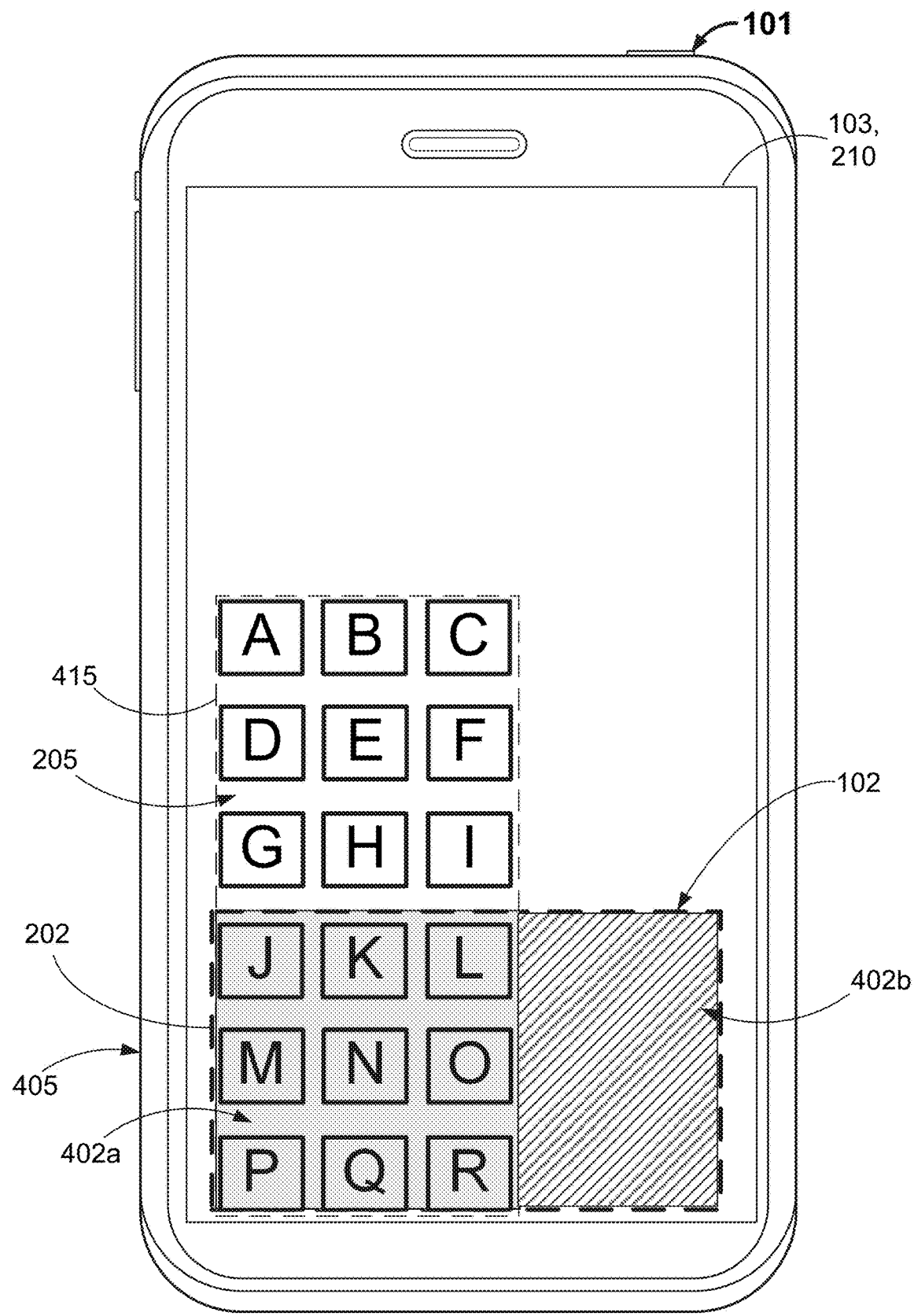
FIG. 4 shows an alternative example of the apparatus of FIG. 2 presenting a GUI a single-handed operational mode.

FIG. 4 shows an alternative example of the apparatus of FIG. 2 presenting a GUI a single-handed operational mode. FIG. 4 shows an example of a single-handed operational mode in which the GUI 205 is being presented in a third configuration. Here, the GUI 205 is being presented in an area 415, which is relatively closer to the left side 405 of the apparatus than the area 315. According to this example, the control system is enabling operation of the fingerprint sensor system 102 only in the active fingerprint sensor area 402a, which corresponds with the overlap of the area 415 and the fingerprint sensor area 202. In this example, the control system is not enabling operation of the fingerprint sensor system 102 in the inactive fingerprint sensor area 402b, which is outside the area 415 when the GUI 205 is being presented in the third configuration.

Figure 5:
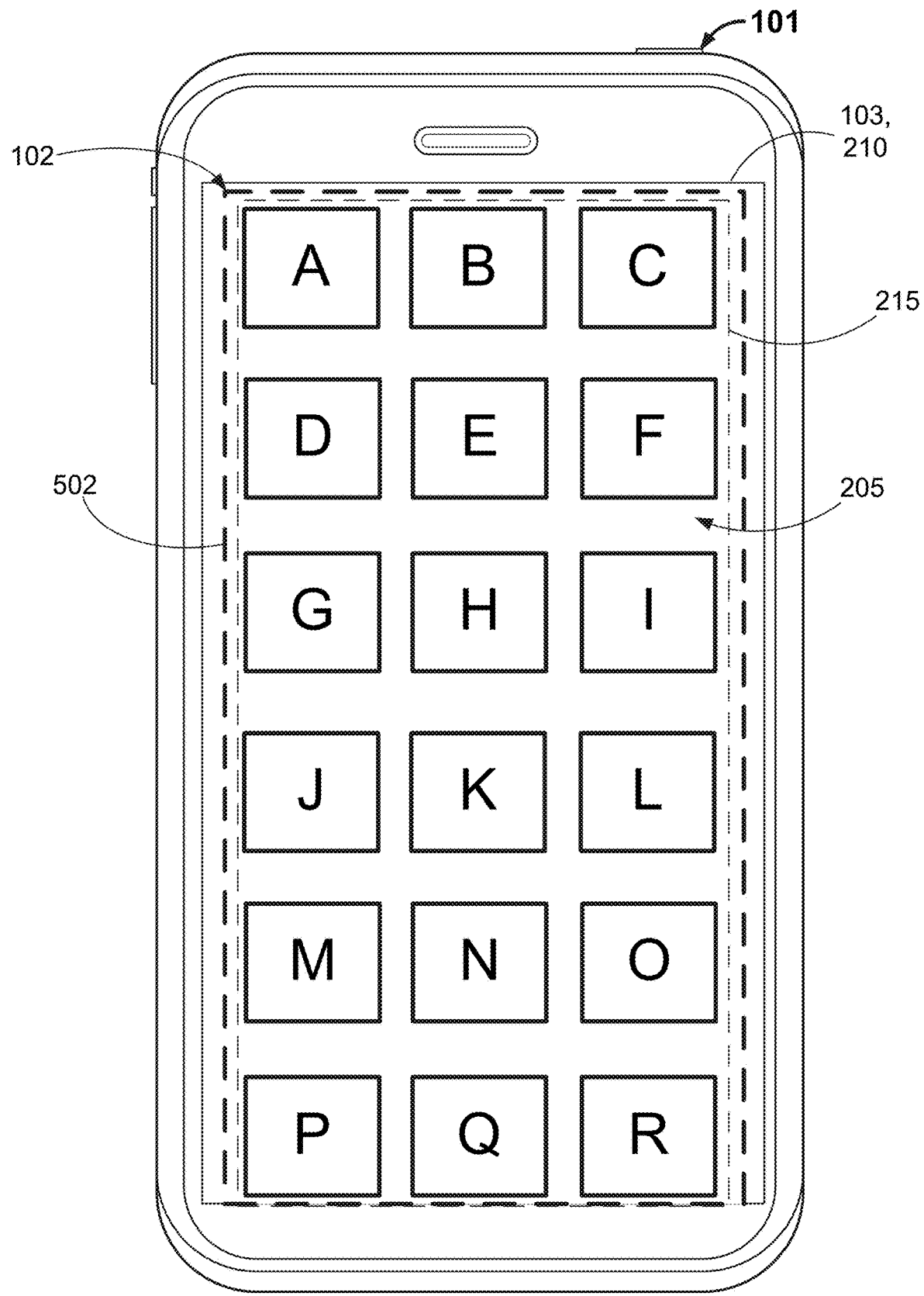
FIG. 5 shows another example of the apparatus of FIG. 1 with a GUI in the first configuration.

FIG. 5 shows another example of the apparatus of FIG. 1 with a GUI in the first configuration. As with other disclosed implementations, the scale, numbers, arrangements and types of the elements shown in FIG. 5 are merely presented for illustrative purposes. Other implementations of the apparatus 101 may have different numbers, arrangements and/or types of elements.

According to this example, the fingerprint sensor system 102 has an fingerprint sensor area 502, which is nearly coextensive with the areas of the touch sensor system 103 and the display 210. The fingerprint sensor area 502 of the fingerprint sensor system 102 is shown in a dashed outline because it resides below the display system 110 in this example. The fingerprint sensor area 502 may, for example, be the area in which an array of fingerprint sensor pixels resides.

In this example, the GUI 205 is the same first configuration or "full-screen mode" that is shown in FIG. 2. However, because the fingerprint sensor area 502 of FIG. 5 is substantially larger than the fingerprint sensor area 202 of FIG. 2, in this example all of the icons A through R are within the fingerprint sensor area 502 when the GUI 205 is being presented in the first configuration. Therefore, the apparatus 101 is capable of providing fingerprint authentication functionality when a user touches an area corresponding to any of the icons A through R.

Figure 6A:
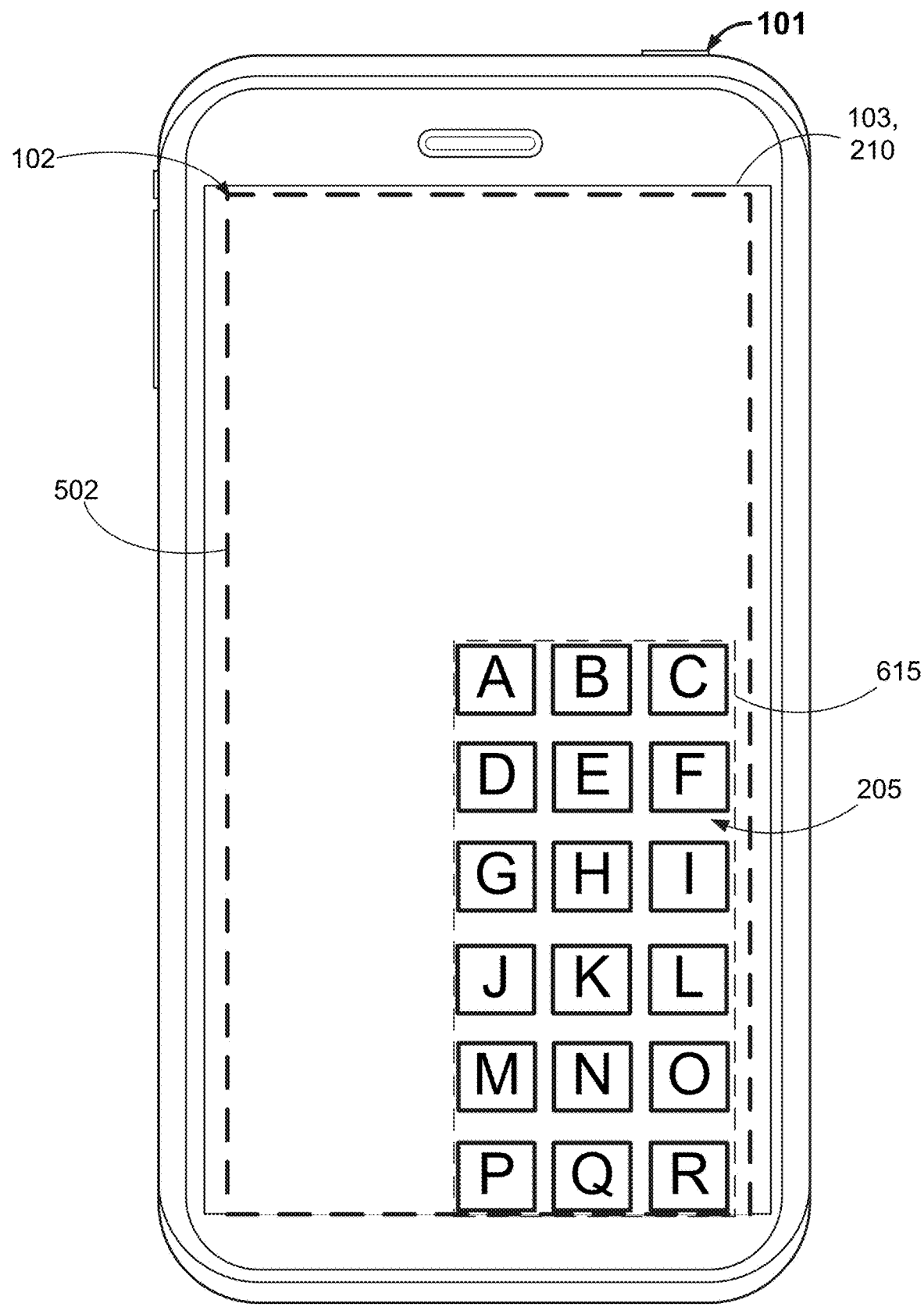
FIG. 6A shows an example of the apparatus of FIG. 5 in a single-handed operational mode.

FIG. 6A shows an example of the apparatus of FIG. 5 in a single-handed operational mode. In this example, the GUI 205 includes the same elements as the GUI 205 of FIG. 5. However, the GUI 205 of FIG. 6A is being presented in a configuration in which the icons A through R are being presented in the area 615, which is substantially smaller than the fingerprint sensor area 502. Therefore, the portion of the fingerprint sensor area 502 that is outside of the area 615 may not be used in connection with any icon of this configuration of the GUI 205. Power that is used for the portion of the fingerprint sensor area 502 that is outside of the area 615 may potentially be wasted.

Figure 6B:
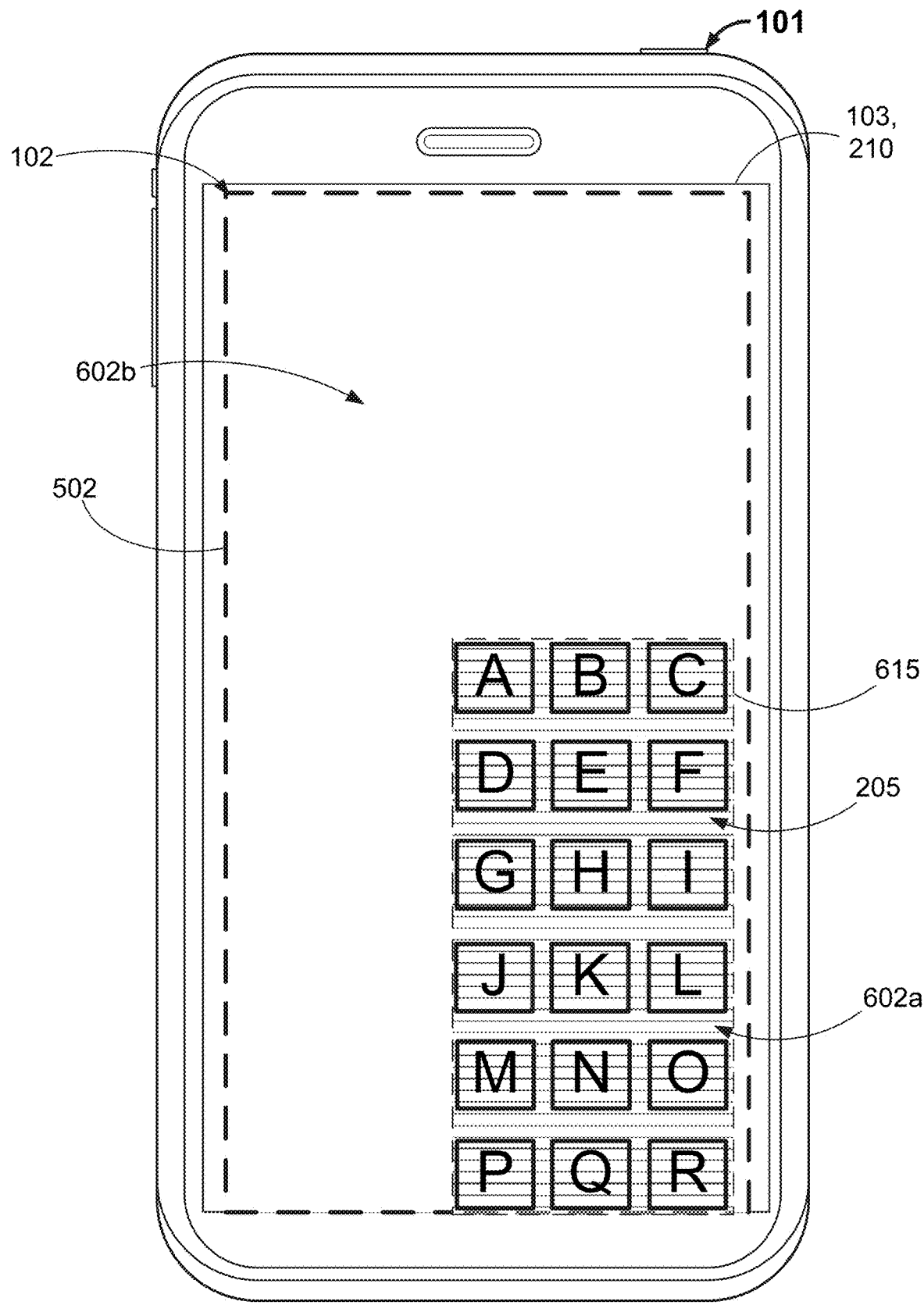
FIG. 6B shows another example of adaptive activation of a fingerprint sensor area.

FIG. 6B shows another example of adaptive activation of a fingerprint sensor area. In this example, the GUI 205 is being presented in the same configuration that is shown in FIG. 6A. However, in this example the control system is enabling operation of the fingerprint sensor system 102 only in the active fingerprint sensor area 602a, which corresponds with the overlap of the area 615 and the fingerprint sensor area 502. In this example, the control system is not enabling operation of the fingerprint sensor system 102 in the inactive fingerprint sensor area 602b, which is outside the area 615 when the GUI 205 is being presented in the second configuration. According to this example, the inactive fingerprint sensor area 602b is substantially larger than the active fingerprint sensor area 602a. Therefore, the implementation that is shown in FIG. 6B can provide a substantial savings in power as compared to the implementation that is shown in FIG. 6A.

The above-described examples of adaptive activation of fingerprint sensor areas have been in the context of single-handed operational modes. However, the innovations of the present disclosure are not limited to single-handed operational mode implementations, but may be used in various other contexts.

Figure 7:
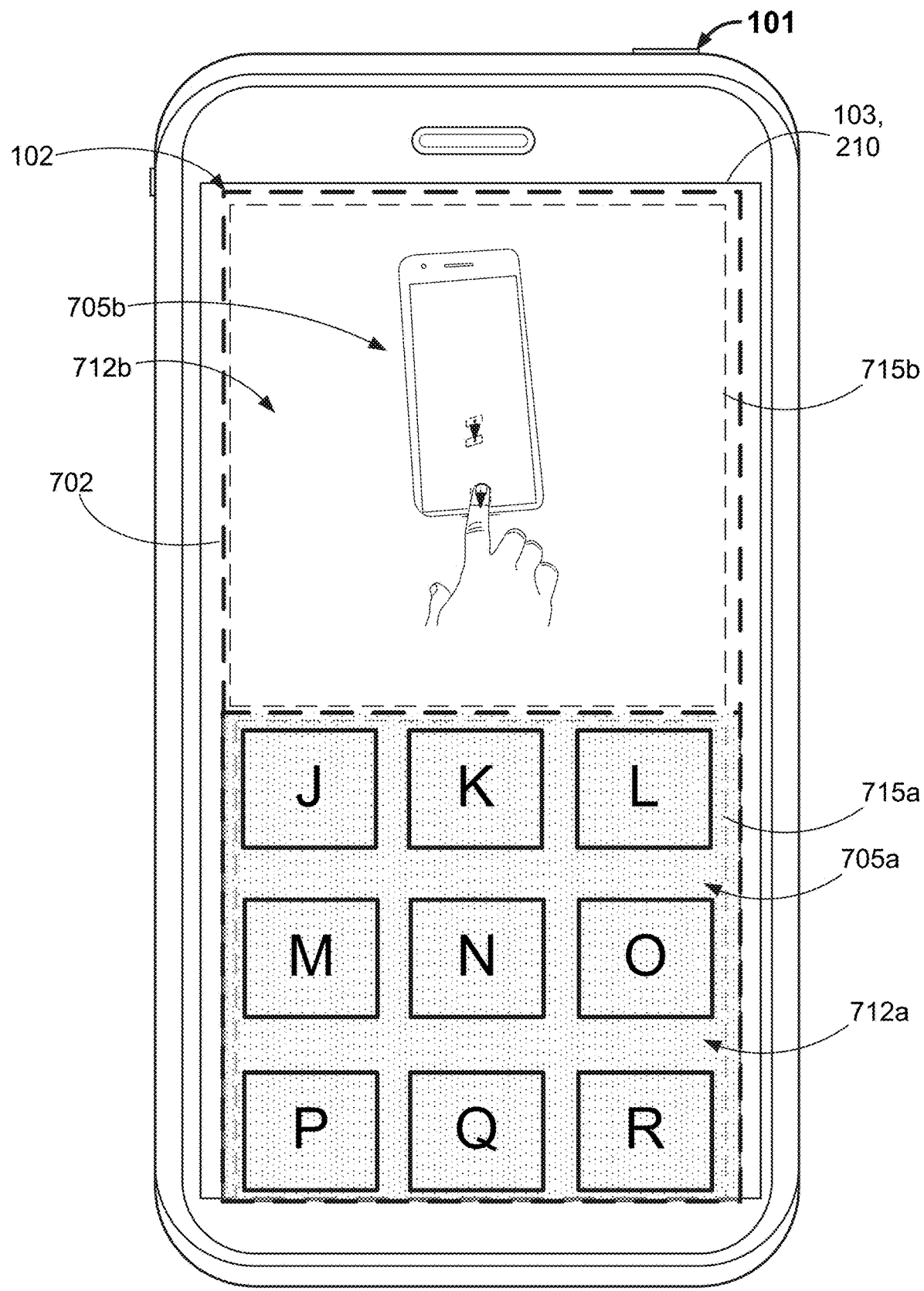
FIG. 7 shows an example of adaptive activation of a fingerprint sensor area in a split screen context.

FIG. 7 shows an example of adaptive activation of a fingerprint sensor area in a split screen context. As with other disclosed implementations, the scale, numbers, arrangements and types of the elements shown in FIG. 7 are merely presented for illustrative purposes. Other implementations may have different numbers, arrangements and/or types of elements.

According to this example, the control system of the apparatus 101 is controlling the display 210 to present a split-screen configuration. In this example, the split-screen configuration includes a first GUI portion (the GUI portion 705a) and a second GUI portion (the GUI portion 705b).

In this implementation, the GUI portion 705a presents icons J through R with which a user may interact in the area 715a. One or more apps corresponding to the icons J through R may provide features that require fingerprint sensor functionality, or that provide a better user experience when implemented with fingerprint sensor functionality. According to this example, the GUI portion 705b is being used to present an instructional video in the area 715b. The app that is being used to present the instructional video does not require fingerprint sensor functionality.

Accordingly, in this implementation the control system is configured to enable fingerprint sensor system operation only in the active fingerprint sensor area 712a, which corresponds with the overlap of the first portion of the split-screen configuration (the GUI portion 705a, corresponding with the area 715a) with the fingerprint sensor area 702. Here, the control system is configured to disable fingerprint sensor system operation in the inactive fingerprint sensor area 712b, which corresponds with the overlap of the second portion of the split-screen configuration (the GUI portion 705b, corresponding with the area 715b) with the fingerprint sensor area 702.

In this example, the area 715b occupies approximately half (slightly more than half) of the fingerprint sensor area 702 and therefore slightly more than half of the fingerprint sensor area 702 does not need to draw power. This example shows that adaptive activation of a fingerprint sensor area in a split-screen context can provide significant power savings.

Figure 8:
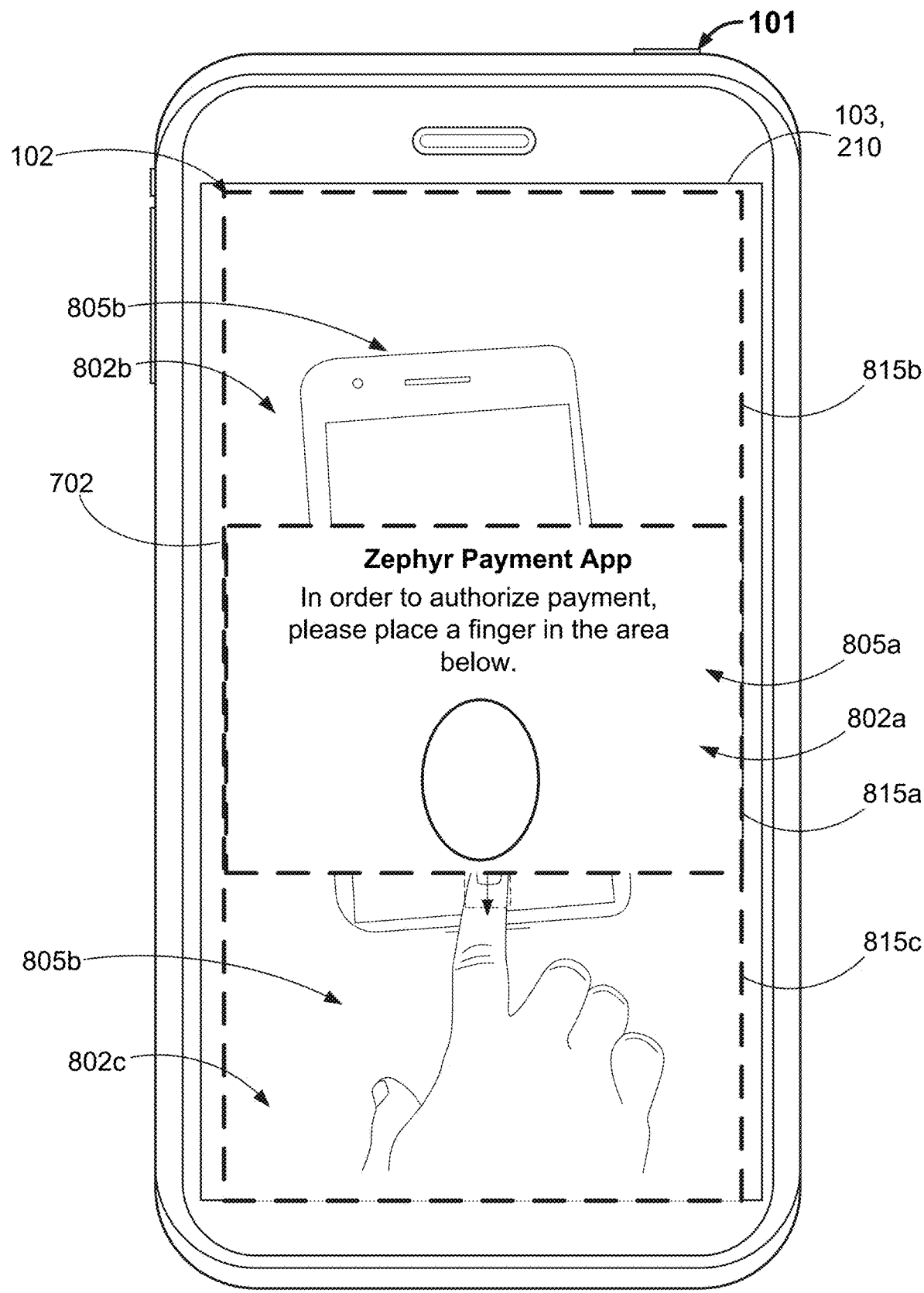
FIG. 8 shows an example of adaptive activation of a fingerprint sensor area in a pop-up view context.

FIG. 8 shows an example of adaptive activation of a fingerprint sensor area in a pop-up view context. As with other disclosed implementations, the scale, numbers, arrangements and types of the elements shown in FIG. 8 are merely presented for illustrative purposes. Other implementations may have different numbers, arrangements and/or types of elements.

According to this example, the control system of the apparatus 101 is controlling the display 210 to present a pop-up view configuration. In this example, the pop-up view configuration includes a first GUI portion (the GUI portion 805a) and a second GUI portion (the GUI portion 805b). In this implementation, the GUI portion 805a is a payment app GUI with which a user may interact in the area 815a. The GUI portion 805a provides features that require fingerprint sensor functionality: in this example, a user may interact with a portion of the fingerprint sensor system 102 in order to authorize a payment.

According to this example, the GUI portion 805b is being used to present a video in the areas 815b and 815c at the time represented by FIG. 8. The app that is being used to present the video does not require fingerprint sensor functionality.

Accordingly, in this implementation the control system is configured to enable fingerprint sensor system operation only in the active fingerprint sensor area 802a, which corresponds with the overlap of the area 815a with the fingerprint sensor area 702. Here, the control system is configured to disable fingerprint sensor system operation in the inactive fingerprint sensor areas 802b and 802c, which correspond with the overlap of the areas 815b and 815c with the fingerprint sensor area 702.

Figure 9:
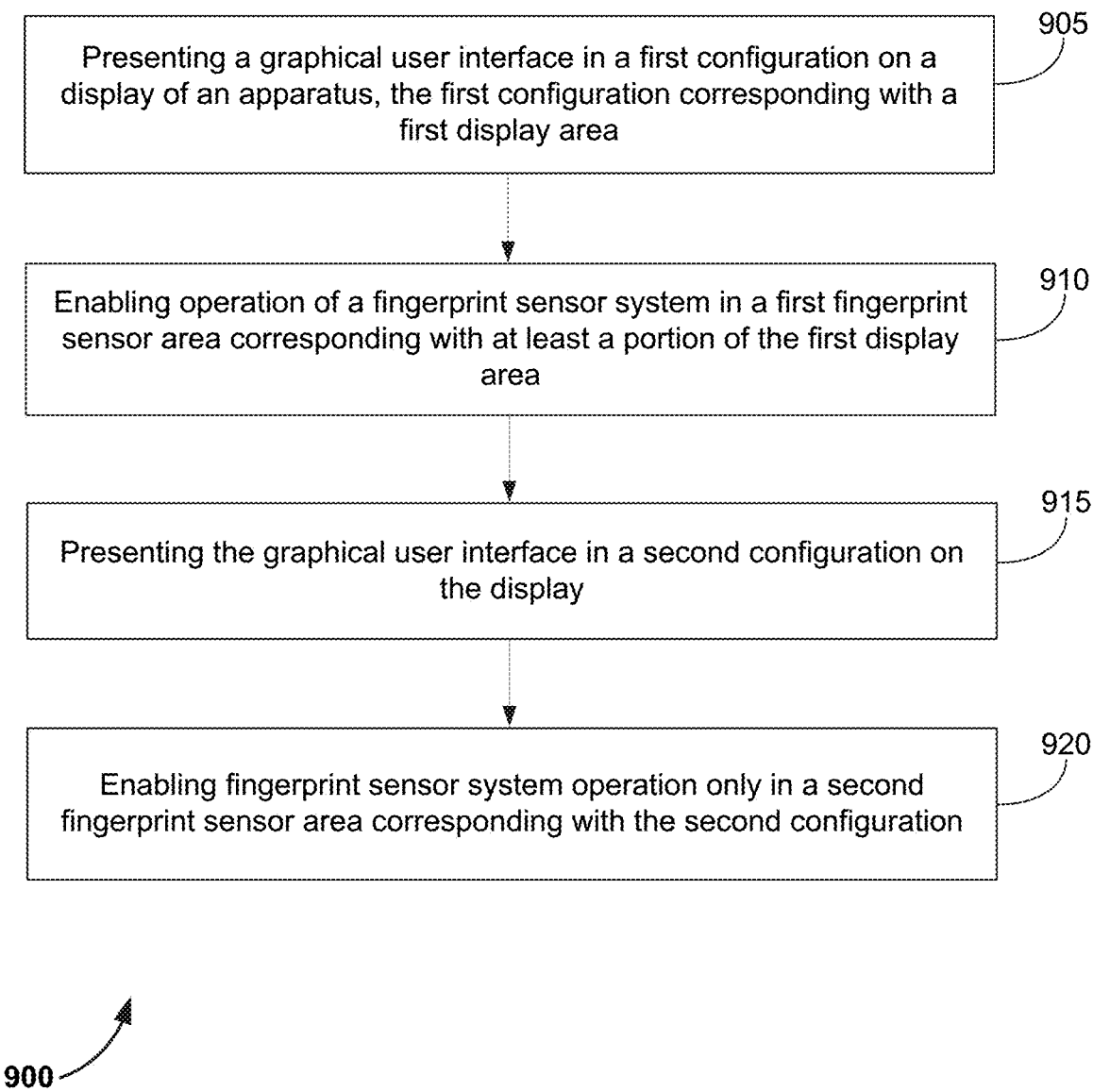
FIG. 9 is a flow diagram that provides examples of operations according to some disclosed methods.

FIG. 9 is a flow diagram that provides examples of operations according to some disclosed methods. The blocks of FIG. 9 may, for example, be performed by the apparatus 101 disclosed herein, or by a similar apparatus. In some examples, method 900 may be performed, at least in part, by the control system 106 that is described herein. As with other methods disclosed herein, the methods outlined in FIG. 9 may include more or fewer blocks than indicated. Moreover, the blocks of methods disclosed herein are not necessarily performed in the order indicated. In some implementations, one or more blocks may be performed concurrently.

In this example block 905 involves presenting a graphical user interface in a first configuration on a display of an apparatus. In this example, the first configuration corresponds with a first display area. According to this example, block 910 involves enabling operation of a fingerprint sensor system in a first fingerprint sensor area corresponding with at least a portion of the first display area. The first display area may or may not correspond with the entire display area, depending on the particular implementation.

In this example block 915 involves presenting the graphical user interface in a second configuration on the display. According to this example, block 920 involves enabling fingerprint sensor system operation only in a second fingerprint sensor area corresponding with the second configuration.

In some examples, the second fingerprint sensor area may correspond with only a portion of the first fingerprint sensor area. In some instances, the second configuration may correspond with some or all of a second display area. In some such examples, the second display area may correspond with only a portion of the first display area.

According to some such examples, the second configuration may correspond with a single-handed operational mode. Some such examples may involve receiving an indication that the single-handed operational mode has been enabled prior to presenting the graphical user interface in the second configuration.

According to some examples, method 900 may involve obtaining fingerprint sensor data from the fingerprint sensor system in the second fingerprint sensor area. Some such examples may involve performing an authentication process based, at least in part, on the fingerprint sensor data. In some implementations, the authentication process may correspond to a payment application area of the graphical user interface in the second configuration. In some examples, the payment application area may correspond with at least a portion of the second fingerprint sensor area.

In some examples, the second configuration may correspond with a split-screen configuration. According to some such examples, fingerprint sensor system operation may be enabled in a first portion of the split-screen configuration and disabled in a second portion of the split-screen configuration.

According to some examples, the second configuration may correspond with a pop-up view configuration. In some such examples, fingerprint sensor system operation may be enabled in a first portion of the pop-up view configuration and disabled in at least a second portion of the pop-up view configuration.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. A method, comprising: presenting a graphical user interface in a first configuration on a display of an apparatus, the first configuration corresponding with a first display area; enabling operation of a fingerprint sensor system in a first fingerprint sensor area corresponding with at least a portion of the first display area; presenting the graphical user interface in a second configuration on the display; and enabling fingerprint sensor system operation only in a second fingerprint sensor area corresponding with the second configuration.

2. The method of clause 1, wherein the second fingerprint sensor area corresponds with only a portion of the first fingerprint sensor area.

3. The method of clause 1 or clause 2, wherein the second configuration corresponds with a second display area.

4. The method of clause 3, wherein the second display area corresponds with only a portion of the first display area.

5. The method of clause 4, wherein the second configuration corresponds with a single-handed operational mode.

6. The method of clause 5, further comprising receiving an indication that the single-handed operational mode has been enabled prior to presenting the graphical user interface in the second configuration.

7. The method of any one of clauses 3-6, wherein the second fingerprint sensor area corresponds with some or all of the second display area.

8. The method of any one of clauses 1-7, further comprising: obtaining fingerprint sensor data from the fingerprint sensor system in the second fingerprint sensor area; and performing an authentication process based, at least in part, on the fingerprint sensor data.

9. The method of clause 8, wherein the authentication process corresponds to a payment application area of the graphical user interface in the second configuration, the payment application area corresponding with at least a portion of the second fingerprint sensor area.

10. The method of any one of clauses 1-9, wherein the first display area corresponds with an entire display area.

11. The method of any one of clauses 1-4, wherein the second configuration corresponds with a split-screen configuration.

12. The method of clause 11, wherein fingerprint sensor system operation is enabled in a first portion of the split-screen configuration and disabled in a second portion of the split-screen configuration.

13. The method of any one of clauses 1-4, wherein the second configuration corresponds with a pop-up view configuration.

14. The method of clause 13, wherein fingerprint sensor system operation is enabled in a first portion of the pop-up view configuration and disabled in at least a second portion of the pop-up view configuration.

15. An apparatus, comprising: a display system including at least a first display; a fingerprint sensor system; and a control system. The control system may be configured to: control the display system to present a graphical user interface in a first configuration on the first display, the first configuration corresponding with a first display area of the first display; enable operation of the fingerprint sensor system in a first fingerprint sensor area corresponding with at least a portion of the first display area; control the display system to present the graphical user interface in a second configuration on the first display; and enable fingerprint sensor system operation only in a second fingerprint sensor area corresponding with the second configuration.

16. The apparatus of clause 15, wherein the second fingerprint sensor area corresponds with only a portion of the first fingerprint sensor area.

17. The apparatus of clause 15 or clause 16, wherein the second configuration corresponds with a second display area of the first display.

18. The apparatus of clause 17, wherein the second display area corresponds with only a portion of the first display area.

19. The apparatus of clause 18, wherein the second configuration corresponds with a single-handed operational mode.

20. The apparatus of clause 19, further comprising a user interface system, wherein the control system is further configured to receive, via the user interface system, an indication to enable the single-handed operational mode prior to presenting the graphical user interface in the second configuration.

21. The apparatus of any one of clauses 15-20, wherein the control system is further configured to obtain fingerprint sensor data from the fingerprint sensor system in the second fingerprint sensor area and perform an authentication process based, at least in part, on the fingerprint sensor data.

22. The apparatus of clause 21, wherein the authentication process corresponds to a payment application area of the graphical user interface in the second configuration, the payment application area corresponding with at least a portion of the second fingerprint sensor area.

23. The apparatus of any one of clauses 15-18, wherein the second configuration corresponds with a split-screen configuration.

24. The apparatus of clause 23, wherein the control system is further configured to enable fingerprint sensor system operation in a first portion of the split-screen configuration and to disable fingerprint sensor system operation in a second portion of the split-screen configuration.

25. The apparatus of any one of clauses 15-18, wherein the second configuration corresponds with a pop-up view configuration.

26. The apparatus of clause 25, wherein the control system is further configured to enable fingerprint sensor system operation in a first portion of the pop-up view configuration and to disable fingerprint sensor system operation in a second portion of the pop-up view configuration.

27. An apparatus, comprising: display means including at least a first display; fingerprint sensor means; and control means for: controlling the display means to present a graphical user interface in a first configuration on the first display, the first configuration corresponding with a first display area of the first display; enabling operation of the fingerprint sensor means in a first fingerprint sensor area corresponding with at least a portion of the first display area; controlling the display means to present the graphical user interface in a second configuration on the first display; and enabling fingerprint sensor means operation only in a second fingerprint sensor area corresponding with the second configuration.

28. The apparatus of clause 27, wherein the second fingerprint sensor area corresponds with only a portion of the first fingerprint sensor area.

29. One or more non-transitory media having instructions stored thereon for controlling one or more devices to perform a method, the method comprising: presenting a graphical user interface in a first configuration on a display of an apparatus, the first configuration corresponding with a first display area; enabling operation of a fingerprint sensor system in a first fingerprint sensor area corresponding with at least a portion of the first display area; presenting the graphical user interface in a second configuration on the display; and enabling fingerprint sensor system operation only in a second fingerprint sensor area corresponding with the second configuration.

30. The one or more non-transitory media of clause 29, wherein the second fingerprint sensor area corresponds with only a portion of the first fingerprint sensor area.

The invention claimed is:

1. A method, comprising:
presenting a graphical user interface (GUI) in a first configuration on a display of an apparatus, the first configuration corresponding with a first display area, the first display area corresponding with an entire display area;
enabling operation of a fingerprint sensor system in a first fingerprint sensor area corresponding with at least a portion of the first display area;
presenting the graphical user interface in a second configuration on the display, wherein the second configuration includes a GUI area, displayed in a portion of the first display area, and an area outside of the GUI area, and wherein the GUI area and the area outside of the GUI area are corresponding with the entire display area; and
enabling fingerprint sensor system operation only in a second fingerprint sensor area corresponding with a portion of the GUI area of the second configuration,
wherein the second fingerprint sensor area includes the portion of the GUI area of the second configuration and a portion of the area outside of the GUI area of the second configuration,
wherein the GUI area includes a plurality of icons,
wherein fingerprint sensor system operation is enabled for each icon of the plurality of icons in the second fingerprint sensor area corresponding with the portion of the GUI area of the second configuration,
wherein fingerprint sensor system operation is disabled in the portion of the area outside of the GUI area of the second configuration.

2. The method of claim 1, wherein the second fingerprint sensor area corresponds with only a portion of the first fingerprint sensor area.

3. The method of claim 1, wherein the second configuration corresponds with a single-handed operational mode.

4. The method of claim 3, further comprising receiving an indication that the single-handed operational mode has been enabled prior to presenting the graphical user interface in the second configuration.

5. An apparatus, comprising:
a display system including at least a first display;
a fingerprint sensor system; and
a control system configured to:
control the display system to present a graphical user interface in a first configuration on the first display, the first configuration corresponding with a first display area of the first display, the first display area corresponding with an entire display area;
enable operation of the fingerprint sensor system in a first fingerprint sensor area corresponding with at least a portion of the first display area;
control the display system to present the graphical user interface in a second configuration on the first display, wherein the second configuration includes a GUI area, displayed in a portion of the first display area, and an area outside of the GUI area, and wherein the GUI area and the area outside of the GUI area are corresponding with the entire display area; and
enable fingerprint sensor system operation only in a second fingerprint sensor area corresponding with a portion of the GUI area of the second configuration,
wherein the second fingerprint sensor area includes the portion of the GUI area of the second configuration and a portion of the area outside of the GUI area of the second configuration,
wherein the GUI area includes a plurality of icons,
wherein fingerprint sensor system operation is enabled for each icon of the plurality of icons in the second fingerprint sensor area corresponding with the portion of the GUI area of the second configuration,
wherein fingerprint sensor system operation is disabled in the portion of the area outside of the GUI area of the second configuration.

6. The apparatus of claim 5, wherein the second fingerprint sensor area corresponds with only a portion of the first fingerprint sensor area.

7. The apparatus of claim 5, wherein the second configuration corresponds with a single-handed operational mode.

8. The apparatus of claim 7, further comprising a user interface system, wherein the control system is further configured to receive, via the user interface system, an indication to enable the single-handed operational mode prior to presenting the graphical user interface in the second configuration.

9. An apparatus, comprising:
display means including at least a first display;
fingerprint sensor means; and
control means for:
control the display means to present a graphical user interface in a first configuration on the first display, the first configuration corresponding with a first display area of the first display, the first display area corresponding with an entire display area;
enable operation of the fingerprint sensor means in a first fingerprint sensor area corresponding with at least a portion of the first display area;
control the display means to present the graphical user interface in a second configuration on the first display, wherein the second configuration includes a GUI area, displayed in a portion of the first display area, and an area outside of the GUI area, and wherein the GUI area and the area outside of the GUI area are corresponding with the entire display area; and
enable fingerprint sensor means operation only in a second fingerprint sensor area corresponding with a portion of the GUI area of the second configuration,
wherein the second fingerprint sensor area includes the portion of the GUI area of the second configuration and a portion of the area outside of the GUI area of the second configuration,
wherein the GUI area includes a plurality of icons,
wherein fingerprint sensor system operation is enabled for each icon of the plurality of icons in the second fingerprint sensor area corresponding with the portion of the GUI area of the second configuration,
wherein fingerprint sensor system operation is disabled in the portion of the area outside of the GUI area of the second configuration.

10. The apparatus of claim 9, wherein the second fingerprint sensor area corresponds with only a portion of the first fingerprint sensor area.

11. One or more non-transitory media having instructions stored thereon for controlling one or more devices to perform a method, the method comprising:
presenting a graphical user interface in a first configuration on a display of an apparatus, the first configuration corresponding with a first display area, the first display area corresponding with an entire display area;
enabling operation of a fingerprint sensor system in a first fingerprint sensor area corresponding with at least a portion of the first display area;
presenting the graphical user interface in a second configuration on the display,
wherein the second configuration includes a GUI area, displayed in a portion of the first display area, and an area outside of the GUI area, and wherein the GUI area and the area outside of the GUI area are corresponding with the entire display area; and
enabling fingerprint sensor system operation only in a second fingerprint sensor area corresponding with a portion of the GUI area of the second configuration,
wherein the second fingerprint sensor area includes the portion of the GUI area of the second configuration and a portion of the area outside of the GUI area of the second configuration,
wherein the GUI area includes a plurality of icons,
wherein fingerprint sensor system operation is enabled for each icon of the plurality of icons in the second fingerprint sensor area corresponding with the portion of the GUI area of the second configuration,
wherein fingerprint sensor system operation is disabled in the portion of the area outside of the GUI area of the second configuration.

12. The one or more non-transitory media of claim 11, wherein the second fingerprint sensor area corresponds with only a portion of the first fingerprint sensor area.

* * * * *